United States Patent
Bang et al.

(10) Patent No.: US 10,227,074 B2
(45) Date of Patent: Mar. 12, 2019

(54) METHOD FOR CONTROLLING SENSE OF SHIFT DIFFERENCE AND 4-WHEEL DRIVE VEHICLE APPLYING THE SAME

(71) Applicant: HYUNDAI MOTOR COMPANY, Seoul (KR)

(72) Inventors: Jae-Sung Bang, Yongin-si (KR); Chan-Ho Lee, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 16 days.

(21) Appl. No.: 15/376,099

(22) Filed: Dec. 12, 2016

(65) Prior Publication Data

US 2018/0099671 A1  Apr. 12, 2018

(30) Foreign Application Priority Data

Oct. 6, 2016  (KR) .................. 10-2016-0128924

(51) Int. Cl.
*B60W 30/188* (2012.01)
*B60W 20/30* (2016.01)
(Continued)

(52) U.S. Cl.
CPC ............ *B60W 30/188* (2013.01); *B60K 6/48* (2013.01); *B60K 6/52* (2013.01); *B60W 10/04* (2013.01);
(Continued)

(58) Field of Classification Search
CPC .. B60W 30/188; B60W 20/50; B60W 10/119; B60W 10/10; B60W 20/30;
(Continued)

(56) References Cited

U.S. PATENT DOCUMENTS 5,839,987 A * 11/1998 Sawamura ............ B60W 10/06
477/107
5,839,989 A * 11/1998 Saito ..................... B60W 10/06
477/143
(Continued)

FOREIGN PATENT DOCUMENTS

JP  2001-158249 A  6/2001
JP  2001-213181 A  8/2001
(Continued)

*Primary Examiner* — David J Hlavka
(74) *Attorney, Agent, or Firm* — Knobbe Martens Olson & Bear LLP (57) ABSTRACT

A 4 wheel drive vehicle removes sense of shift difference through an acceleration shift control mode, and the acceleration shift control mode transfers an independent other drive shaft input torque to a drive shaft not connected to a transmission with respect to a transmission input torque transferred to a drive shaft connected with the transmission, so that a vehicle acceleration in an actual shift section connecting between a fore-section and post-section of the shift can be maintained to be equal to the vehicle acceleration of the fore-section and post-section of the, thereby overcoming the transfer torque change, which is not overcome in a conventional slip control method, speed control method and time control method, when transferring a torque to the drive wheels in the actual shift section and realizing the shift quality without the sense of shift difference.

4 Claims, 7 Drawing Sheets

(51) Int. Cl.
*B60K 6/48* (2007.10)
*B60W 20/50* (2016.01)
*B60W 20/10* (2016.01)
*B60K 6/52* (2007.10)
*B60W 10/04* (2006.01)
*B60W 10/10* (2012.01)
*B60W 10/119* (2012.01)
*F16H 61/04* (2006.01)
*F16H 63/50* (2006.01)
*F16H 59/48* (2006.01)

(52) U.S. Cl.
CPC .......... *B60W 10/10* (2013.01); *B60W 10/119* (2013.01); *B60W 20/10* (2013.01); *B60W 20/30* (2013.01); *B60W 20/50* (2013.01); *F16H 61/0437* (2013.01); *B60W 2510/1025* (2013.01); *B60W 2520/105* (2013.01); *B60W 2710/083* (2013.01); *B60W 2720/40* (2013.01); *B60Y 2200/92* (2013.01); *B60Y 2300/19* (2013.01); *F16H 59/48* (2013.01); *F16H 63/502* (2013.01); *Y10S 903/93* (2013.01)

(58) Field of Classification Search
CPC ................. B60W 10/04; B60W 20/10; B60W 2510/1025; B60W 2520/105; B60W 2710/083; B60W 2720/40; B60K 6/52; B60K 6/48; F16H 63/502; B60Y 2300/19; B60Y 2200/92
See application file for complete search history.

(56) References Cited

U.S. PATENT DOCUMENTS

| | | | |
|---|---|---|---|
| 9,802,616 B2* | 10/2017 | Horst | B60W 30/188 |
| 2004/0099498 A1* | 5/2004 | Kurita | B60N 2/1615 |
| | | | 192/12 B |
| 2005/0060076 A1* | 3/2005 | Phillips | B60K 6/44 |
| | | | 701/51 |
| 2009/0143950 A1* | 6/2009 | Hasegawa | B60K 6/48 |
| | | | 701/68 |
| 2013/0261862 A1* | 10/2013 | Nishimori | B60W 20/40 |
| | | | 701/22 |
| 2016/0318400 A1* | 11/2016 | Sakaguchi | B60T 8/17616 |

FOREIGN PATENT DOCUMENTS

| | | |
|---|---|---|
| JP | 2004-347128 A | 12/2004 |
| JP | 2008-537708 A | 9/2008 |
| JP | 2011-67018 A | 3/2011 |
| KR | 10-2012-0009361 A | 2/2012 |

* cited by examiner

METHOD FOR CONTROLLING SENSE OF SHIFT DIFFERENCE AND 4-WHEEL DRIVE VEHICLE APPLYING THE SAME

CROSS-REFERENCE TO RELATED APPLICATION

This application claims priority to the benefit of Korean Patent Application No. 10-2016-0128924 filed in the Korean Intellectual Property Office on Oct. 6, 2016, which is incorporated herein by reference in its entirety.

BACKGROUND

Field

The present disclosure relates to a shift control of a 4-wheel drive vehicle.

Description of the Related Art

Generally, an E_4WD system (Electric 4-wheel Drive system) is configured so that a transmission (an automatic transmission or double clutch transmission) and an engine (torque source 1) are directly connected to the front wheels and a motor (torque source 2) is directly connected to the rear wheels.

Therefore, the E_4WD system has applied a shift control for removing sense of shift difference by the change of a driver request torque realized by the sum of torque source 1, 2 or the change of a vehicle speed by that the wheel torque transmitted from the front wheels is changed by a slip in the actual shift section comparing to the case that a clutch or a brake of a transmission before and after shifting is directly connected.

For example, the shift control may include a speed control shift method or a time control shift method. The speed control shift method may increase shift quality by realizing quick shift through a speed control. The time control shift method may improve shift quality by maintaining the acceleration before and after the actual shifting section to the maximum through variable control of the shift time.

As the result, the 4WD vehicle applying the E_4WD system may realize more advanced shift quality through the speed control shift method or the time control shift method beyond the simple slip control shift method, and provide the merits capable of simultaneously realizing 4WD and HEV (Hybrid Electric Vehicle) functions.

However, the speed control shift method or the time control shift method may only provide more improved shift quality comparing to the slip control shift method and may be bound to be limited in fully eliminating the sense of shift difference. Such reason results from that the 4WD vehicle applying the E_4WD system cannot avoid the change of the transmitted torque when transmitting a torque to drive wheels in the actual shift section.

Therefore, the speed control shift method or the time control shift method like the slip control method are bound to have the limits that they are not to be fundamental problem solutions for the sense of shift difference of a 4WD vehicle applying an E_4WD system.

The disclosure of this section is to provide background of the invention. Applicant notes that this section may contain information available before this application. However, by providing this section, Applicant does not admit that any information contained in this section constitutes prior art.

SUMMARY

The present disclosure has been made in an effort to provide a 4WD drive vehicle in which an acceleration shift control mode for removing the sense of shift difference through the acceleration substantially equally maintained in sections before and after shifting and actual shift by the independent torque to be transmitted to a drive shaft connected to a transmission when the actual shift is performed through the torque source directly connected to the drive shaft not connected with the transmission, can be realized.

The control method according to embodiments of the present invention may include a step of determining whether the shift is required or not; a step of preparing the shift and calculating an average vehicle acceleration; a step of determining actual shift; a step of calculating a torque for maintaining the previously calculated average vehicle acceleration through a torque source connected to a drive shaft not connected with a transmission in actual shifting and then making it to a command torque; and a step of applying the command torque to the drive shaft through torque source.

On the other hand, the control method according to embodiments the present invention may realize an acceleration shift control mode through a controller in shifting during travelling of a vehicle, wherein the acceleration shift control mode may perform (A) a step of making before shift section to A so that the A may be matched to SP (Shift Phase) of the transmission dividing fore-section and post-section of the actual shift section into a shift preparation section and a shift completion section, respectively, and calculating an average value $G_{avg}$ of the vehicle acceleration, (B) a step of recognizing an actual shift section entry when the A gets out of the shift preparation section, (C) a step of calculating a transmission transfer torque $TQ_{transfer}$ or a transmission intervention torque $TQ_{intervention}$ after entering into the actual shift section; (D) a step of outputting a transmission input torque $TQ_{input}$-1 and the other drive shaft input toque $TQ_{input}$-2 through a torque prediction mode using the transmission transfer torque $TQ_{transfer}$; and (E) a step of outputting a transmission input torque $TQ_{input}$-1 and the other drive shaft input toque $TQ_{input}$-2 through a torque intervention mode using the transmission intervention torque $TQ_{intervention}$.

In embodiments, the acceleration shift control mode may be performed according to shift conditions of a driver request torque $TQ_{driver}$ of a vehicle or a vehicle speed V, the shift conditions may be satisfied when the change of the driver request torque or the change of the vehicle speed performs the shift, and the driver request torque and the vehicle speed may be monitored by a controller.

In embodiments, the average value $G_{avg}$ of the vehicle acceleration is the average of a vehicle acceleration measurement value of a G sensor in the shift preparation section. The A is a calibration factor having a number greater than 0 and smaller than the actual shift section. The transmission transfer torque $TQ_{transfer}$ is calculated by using slip being generated inside of the transmission.

In embodiments, the torque prediction mode may perform, (D-1) a step of calculating the difference between the driver request torque $TQ_{driver}$ of the vehicle and the transmission transfer torque $TQ_{transfer}$, and defining the calculated difference value as a first acceleration maintenance control torque $TQ_{feedforward}$-1; and (D-2) a step of outputting the transmission intervention torque $TQ_{intervention}$ as the transmission input torque $TQ_{input}$-1 in the state of entering into the actual shift section, and summing an error compensation $G_{avg\_compensation}$ value correcting the average value of the vehicle acceleration to a present vehicle acceleration and the first acceleration maintenance control torque $TQ_{feedforward}$-1 and outputting it to the other drive shaft input torque $TQ_{input}$-2.

In embodiments, the torque intervention mode may perform, (E-1) a step of calculating the deference between the driver request torque $T_{driver}$ of the vehicle and the transmission intervention torque $TQ_{intervention}$, and defining the calculated difference value as a second acceleration maintenance control torque, (E-2) a step of outputting the transmission intervention torque $TQ_{intervention}$ as the transmission input torque TQinput-1 in the state of entering into the actual shift section, and summing an error compensation $G_{avg\_compensation}$ value correcting the average value $G_{avg}$ of the vehicle acceleration to a present vehicle acceleration and the second acceleration maintenance control torque $TQ_{feedforward}$-2 and outputting it to the other drive shaft input torque $TQ_{input}$-2.

Furthermore, in embodiments, the 4 wheel drive vehicle include a controller transferring an independent other drive shaft input torque $TQ_{input}$-2 to a drive shaft not connected to a transmission with respect to a transmission input torque $TQ_{input}$-1 transferred to a drive shaft connected with the transmission, so that a vehicle acceleration in an actual shift section connecting between a fore-section and post-section of the shift can be maintained to be equal to the vehicle acceleration of the fore-section and post-section of the shift when shifting during travelling of a vehicle; a transmission controller controlling the transmission; and a G sensor measuring a vehicle acceleration.

In embodiments, the controller may be composed of a torque source controller controlling a torque source 1 generating the transmission input torque and a torque source 2 generating the other drive shaft input torque, and a torque map controller being connected with the torque source controller and correcting an error of a vehicle acceleration through a feedback controller.

The 4-wheel drive vehicle applying the E_4WD system according to embodiments of the present invention may implement the following advantages and effects by applying a shift control of an acceleration control shift method to all shift class.

Firstly, The 4-wheel drive vehicle may improve shift quality by transferring a positive torque (+ torque) to drive wheels through a torque source not connected with a transmission in power on up/down shift, secondly, improve shift quality by transferring a negative torque (− torque) to drive wheels through a torque source not connected with a transmission in power off up/down shift, and thirdly, may be possible to solve the lack of the brake torque by shift such as shift before stopping by using a torque source not connected with a transmission.

BRIEF DESCRIPTION OF THE DRAWINGS

The above and other aspects, features and advantages of the present invention will be more clearly understood from the following detailed description taken in conjunction with the accompanying drawings, in which.

DESCRIPTION OF EMBODIMENTS

One aspect of the present invention provides a system for controlling a wheel-driving motor in an electric 4WD (E-4WD) vehicle. The electric 4WD (E-4WD) vehicle has a motor 20-2 and an engine 20-1. In embodiments, the motor 20-2 and the engine 20-1 operate independently such that they can provide different driving torques to different wheels of the vehicle. In embodiments, a transmission 40 connected to the engine 20-1 drives one or more front wheels 1-1, not a rear wheel. The motor 20-2 drives one or more rear wheels, not a front wheel.

In embodiments, a controller 30 of the vehicle computes a driver request torque ($TQ_{driver}$) based on a driver's input on the acceleration pedal. The controller 30 controls the engine 20-1 and the motor 20-2 to provide the driver request torque ($TQ_{driver}$). In embodiments, the controller 30 computes a transmission input torque ($TQ_{input}$-1) that the transmission 40 needs to provide to accomplish the driver request torque ($TQ_{driver}$) assuming the motor provides its required torque (motor input torque). Further, the controller 30 computes a motor input torque (another drive shaft input torque, $TQ_{input}$-2) that the motor needs to provide to accomplish the driver request torque ($TQ_{driver}$) assuming the transmission provides its required torque (transmission input torque). The controller controls the engine 20-1 using the transmission input torque and also controls the motor 20-2 using the motor input torque.

In embodiments, the controller 30 monitors the driver request torque ($TQ_{driver}$) and the vehicle's speed and determines whether a predetermined set of conditions for a gear shift is satisfied (S10). When the predetermined set of conditions is satisfied, a transmission controller 50 causes the transmission 40 to make a gear shift. During the gear shift, torque generated from the transmission 40 is not fully transmitted to the front wheel due to a slip inside the transmission 40, which results in transmitting a reduced torque ($TQ_{transfer}$) to the front wheel(s). In embodiments, the controller 30 computes the reduced torque ($TQ_{transfer}$) based on information from sensors monitoring the operation of the transmission 40 and also based on information from the transmission controller 50.

In embodiments, the motor input torque ($TQ_{input}$-2) is computed in view of the computed reduced torque ($TQ_{transfer}$) to compensate the loss of torque in the transmission during the gear shift. In embodiments, in computing the motor input torque for the motor 20-2 ($TQ_{input}$-2), the controller 30 computes a feedforward torque ($TQ_{feedforward}$-1) using the driver request torque ($TQ_{driver}$) and the computed reduced torque ($TQ_{transfer}$) (S50 in FIG. 1B). In embodiments, in calculating the motor input torque of the motor 20-2 ($TQ_{input}$-2) the controller further considers the vehicle's acceleration measured by an acceleration sensor 70 (S52 in FIG. 1B).

Figure 1A:
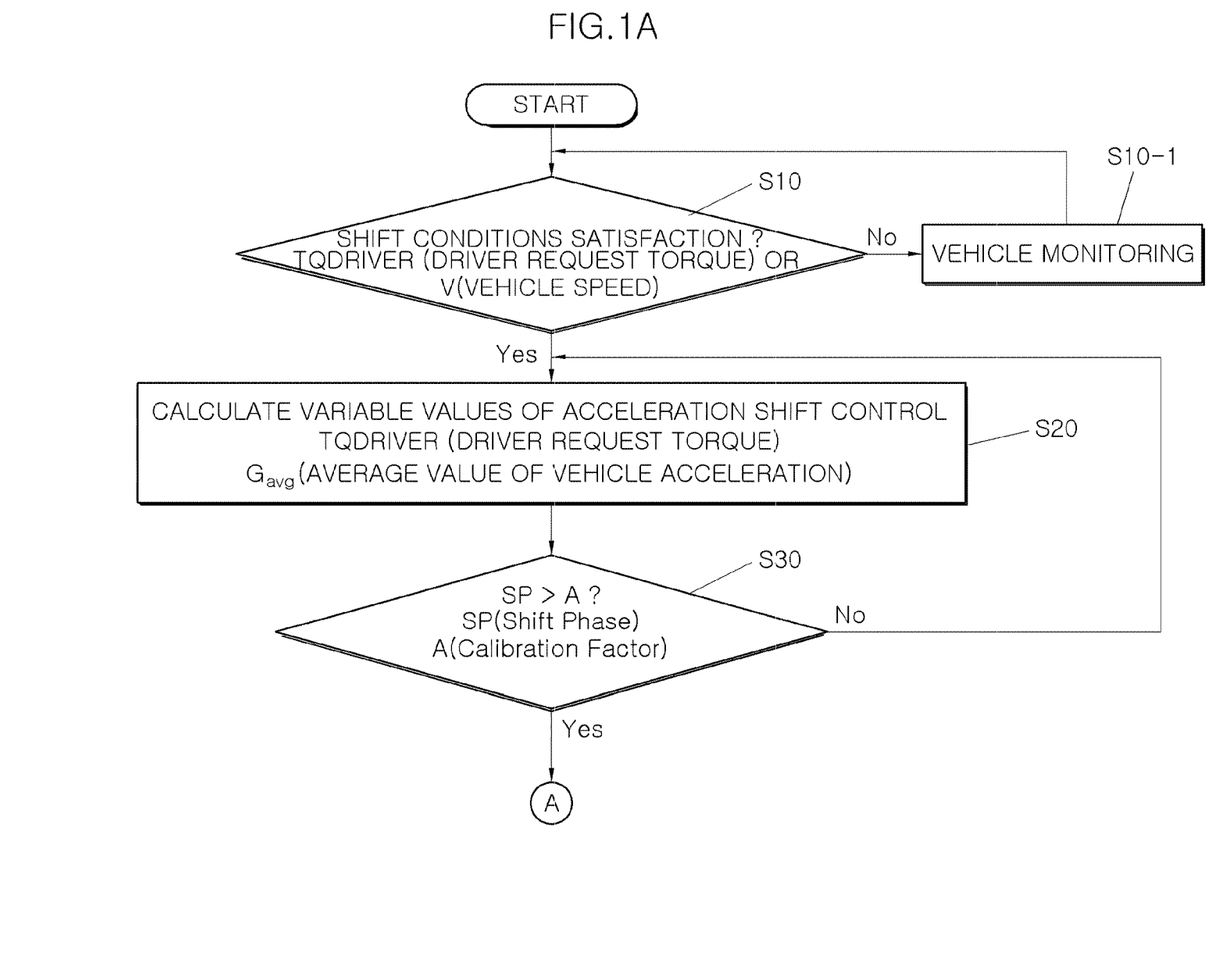
FIGS. 1A and 1B are a flow chart of a method of controlling sense of shift difference using an acceleration shift control mode according to embodiments of the present invention.
Figure 1B:
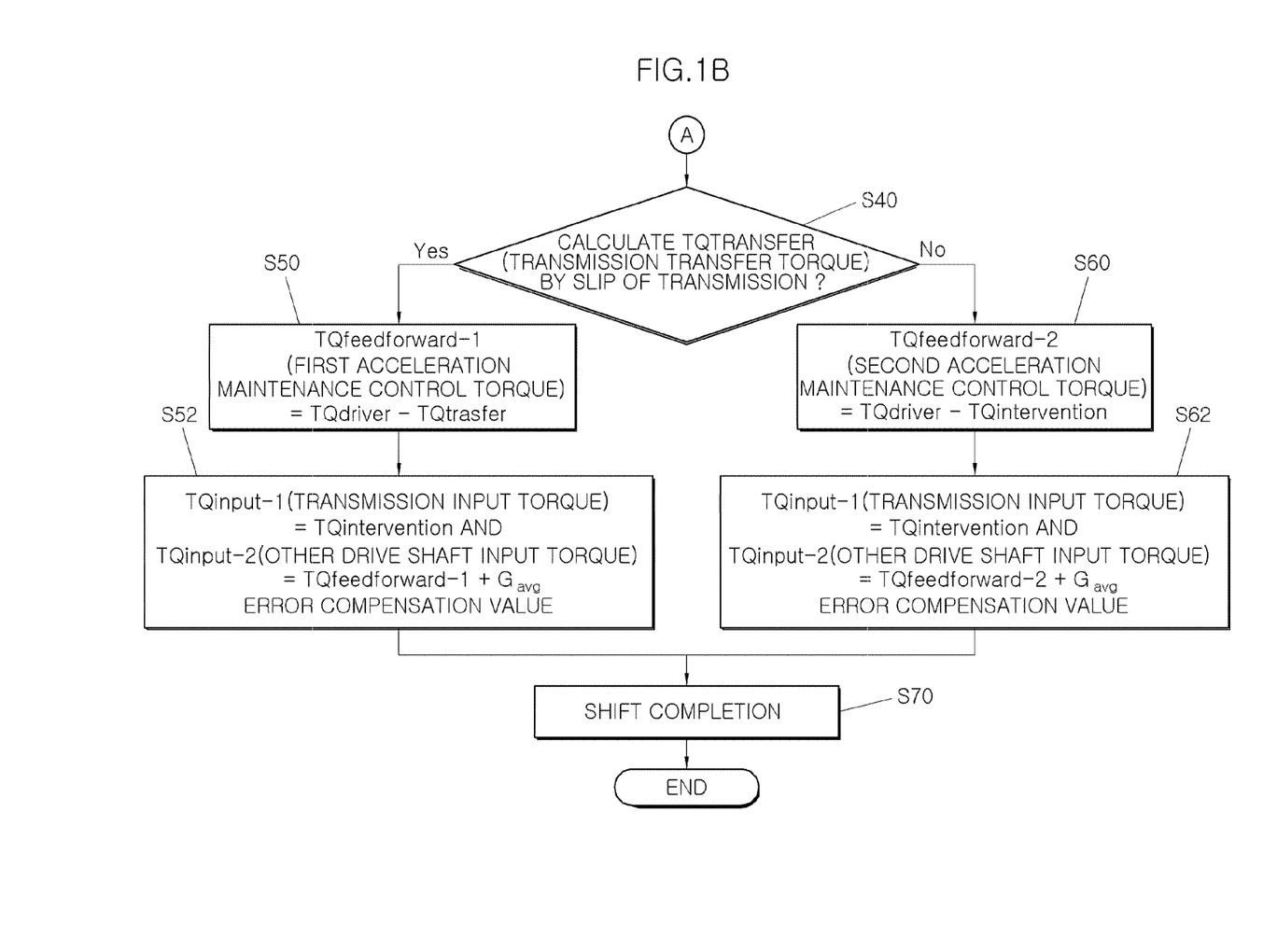

Referring to FIGS. 1A and 1B, a method for sense of shift difference may perform an acceleration shift control mode between a step S10 of determining whether shift is necessary and a shift completion step S70. In the acceleration shift control mode, the calculation of variable values for the acceleration shift control may be achieved such as S20, predictability determination of a transfer torque $TQ_{transfer}$ by slip inside of a transmission when moving from a shift preparation section SP ((Shift Phase)=A)) to an actual shift section such as S30 and S40 may be achieved, and then, the other drive shaft input torque $TQ_{input}$-2 of the other drive shaft (not connected with a transmission, for example, rear wheels) may be changed such as S50 or S60 in a state that a transmission input torque $TQ_{input}$-1 of a drive shaft (connected with the transmission, for example front wheels) is in constant. As the result, the acceleration shift control mode may overcome the structural limits of not avoiding the transfer torque change when transferring a torque to the drive wheels in an actual shift section other than a slip control shift method, a speed control shift method and a time control shift method by equally maintaining the acceleration in before and after shift and the actual shift section.

Figure 2:
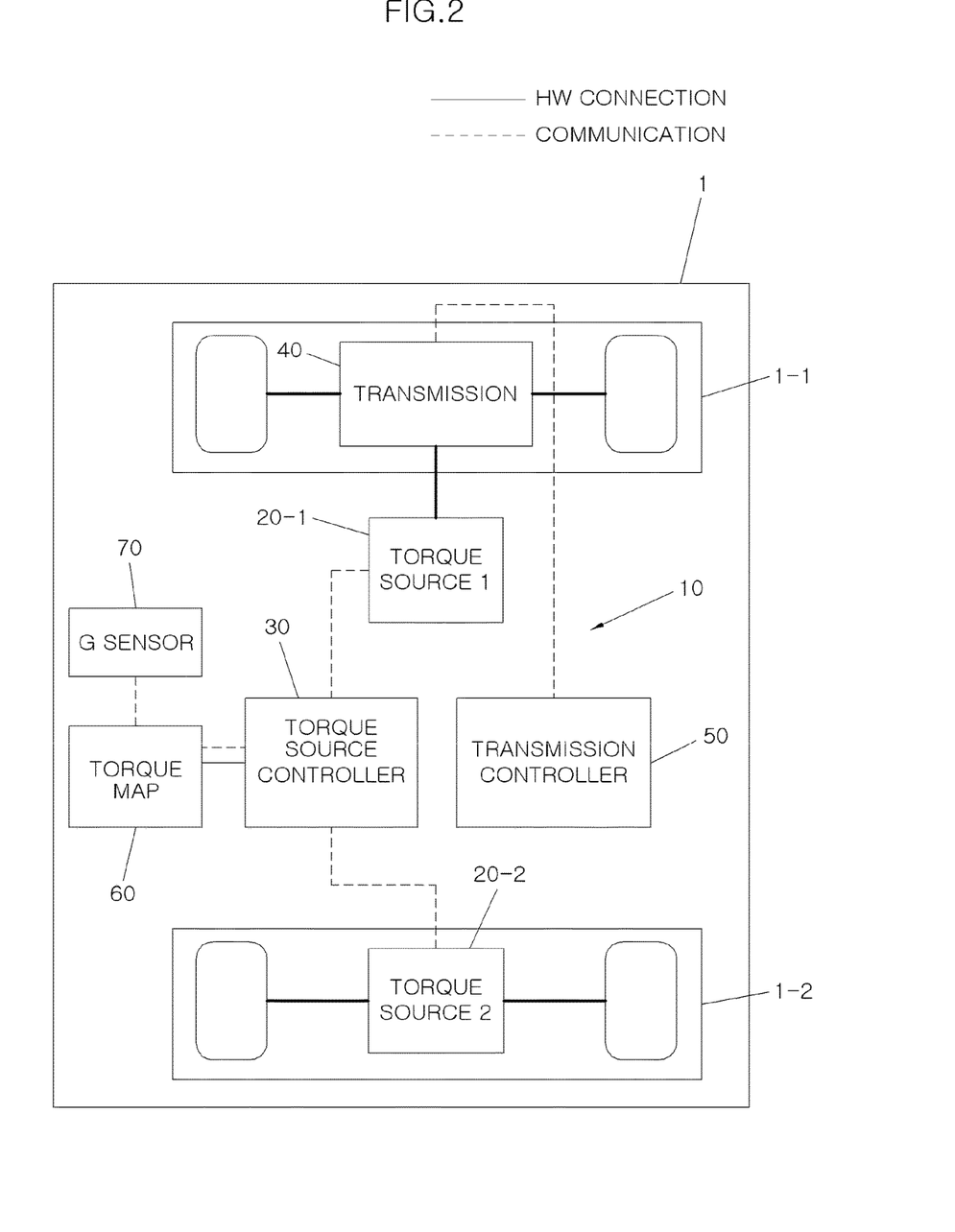
FIG. 2 is an example of a 4-wheel drive vehicle in which an acceleration shift control mode according to embodiments of the present invention is implemented.

Referring to FIG. 2, a 4WD vehicle 1 may include E_4WD system 10 (Electric 4-wheel Drive system), an automatic transmission or a double clutch transmission type transmission 40, and G sensor 70 for detecting an acceleration of a vehicle. The E_4WD system 10 may include a torque source 1 20-1 (for example, an engine) transferring a power to front wheels 1-1, a torque source 220-2 (for example, a motor) transferring a power to rear wheels 1-2, a torque source controller 30 for controlling individually or synthetically controlling the torque source 1 20-1 and the torque source 220-2, a transmission controller 50 for controlling the transmission 40 connected to the torque source 1 20-1, and a torque map controller 60 connected to the torque source controller 30 in order to carry out the acceleration shift control mode.

Particularly, the torque map controller 60 may be composed of a feedback controller for correcting the error between an average vehicle acceleration and a present vehicle acceleration in order to satisfy an average vehicle acceleration in the actual shift section, may calculate an acceleration maintenance control torque $TQ_{feedback}$ (for example, $TQ_{feedback}$-1, $TQ_{feedback}$-2) and, for this, may apply PID control or various kinds of control algorithm. Examples of the feedback controller are described in detail through FIGS. 4 and 5 below.

The E_4WD system 10 may connect the front wheels 1-1 with the transmission 40, the transmission 40 with the torque source 1 20-1, the rear wheels 1-2 with the torque source 2 20-2, and the torque source controller 30 with the torque map controller 60 via hardware, and connect the torque source controller 30 with the torque source 1 20-1 and the torque source 2 20-2, the torque source controller 30 with the torque source controller 30, the transmission controller 50 with the transmission 40, and the torque map controller 60 with the G sensor 70 via communication network.

Hereinafter, an embodiment of the method for controlling sense of shift difference using the acceleration shift control mode will be described in detail with reference to FIG. 3 to FIG. 6. A control subject of the acceleration shift control mode is the torque source controller 30 connected to the torque map controller 60 and will be explained as a controller. A control subject of the acceleration shift control mode is the torque source 220-2 but may include the torque source 1 20-1, if necessary.

The step S10 may determine, by the controller, whether shift conditions are satisfied or not in a state that the 4WD vehicle 1 applying the E_4WD system 10 is travelling. For this, the controller may monitor the change of the driver request torque $TQ_{driver}$ or the change of a vehicle speed V and then, determine shift conditions satisfaction through the change degrees. In this regard, the driver request torque $TQ_{driver}$ means the sum of the torque source 1 20-1 and the torque source 2 20-2, the vehicle speed V means the travelling speed of the 4WD vehicle 1 and the shift conditions satisfaction means that the transmission controller 50 changes the shift stages of the transmission 40.

As the result, the controller enters into the step S20 in a state of shift conditions satisfaction while continuing to monitor such as the step S10-1.

The step S20 may calculate variable values applied to the acceleration shift control by the controller, and the step S30 may detect, by the controller, whether entering the shift preparation section of shift phase SP or not.

Figure 3:
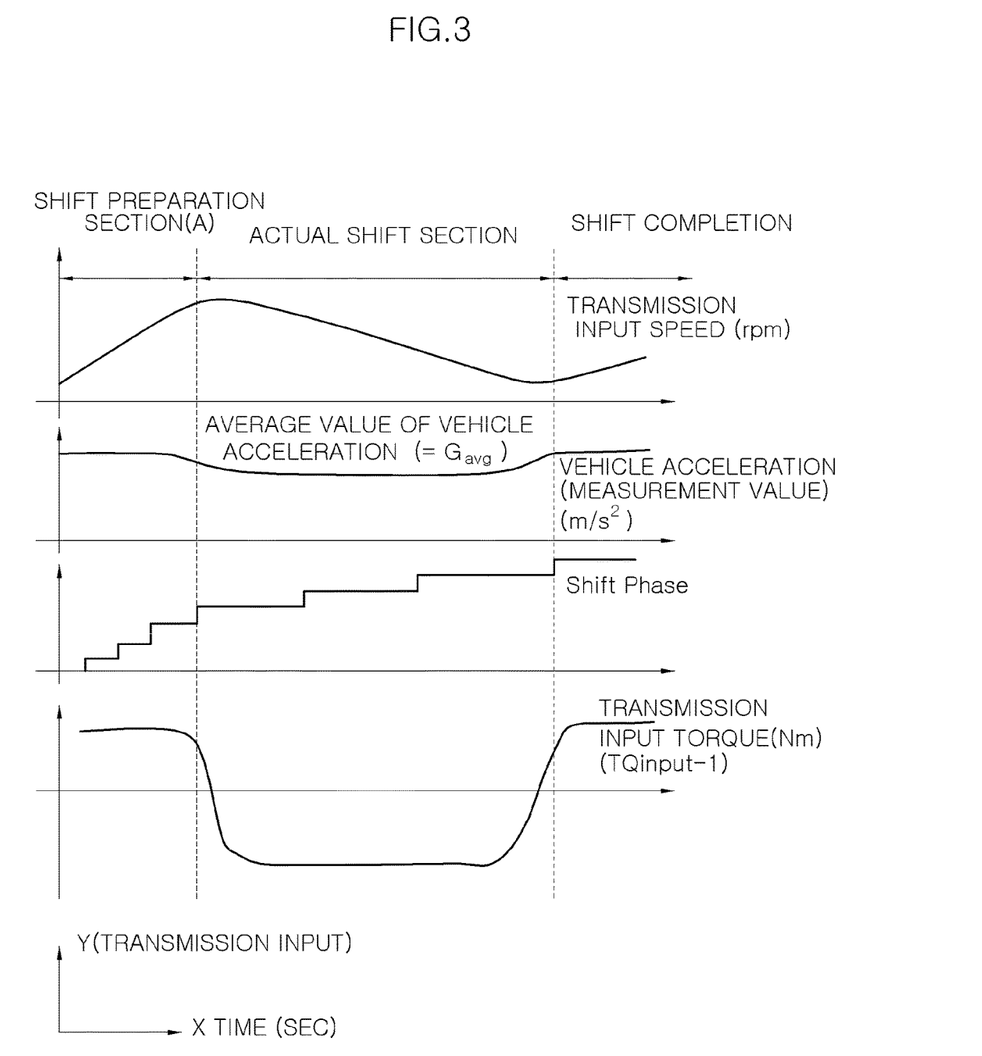
FIG. 3 is an example of a shift process before a 4-wheel drive vehicle according to embodiments of the present invention removes sense of shift difference through the acceleration shift control mode.

Referring to the shift process of FIG. 3, the shift phase SP may be divided into a shift preparation section, an actual shift section and a shift completion section from the SP line for a transmission input speed of a shift line, and it is known from an acceleration line that a vehicle acceleration measurement value is significantly lowered in the actual shift section. Particularly, the shift phase SP may be divided into numbers greater than 0 in the shift preparation section, the actual shift section and the shift completion section, and the number sizes have the relationship of shift preparation section<the actual shift section<the shift completion section. In this regard, "<" is a sign of inequality that represents the size of two values.

Therefore, the controller may detect the driver request torque $TQ_{driver}$ through a present vehicle speed, a present gear stage and an amount of moving an accelerator pedal track, and so on, and calculate an average vehicle acceleration value $G_{avg}$ as an average value of a vehicle acceleration measurement value measured by the G sensor. As the result, the torque source 1 20-1 and the torque source 2 20-2 may be distributed based on the decided driver request torque $TQ_{driver}$. Furthermore, the controller may determine that the shift conditions satisfaction state is converted into the shift preparation state from the relationship of SP>A. In this regard, the SP is the shift phase, the A represents before shift phase matched to the shift preparation section among the shift preparation section, the actual shift section and the shift completion section of the SP as a calibration factor having a number greater than 0, and ">" is a sign of inequality that represents the size of two values.

Therefore, the non-satisfaction of SP>A means that the SP does not leave the shift preparation section, and that the vehicle acceleration measurement value measured by the G sensor 70 in the shift preparation section is calculated to the average vehicle acceleration value $G_{avg}$.

As the result, as the satisfaction of SP>A means that the SP leave the shift preparation section and then, enters into the actual shift section, the controller enters into the step S40, thereby converting the shift preparation section into the shift starting state.

The step S40 may determine, by the controller, whether the transfer torque $TQ_{transfer}$ by slip inside of the transmission is predicted or not. The reason for this is because the slip occurred inside of the transmission 40 when moving from the shift preparation section to the actual shift section, predicts transfer torque $TQ_{transfer}$ which the transmission 40 transfers to the drive shaft (front wheels 1-1). For this, the controller may use monitoring data for the transmission 40 or cooperatively control with the transmission controller 50.

As the result, the controller may convert into a torque prediction mode of the steps of S50 and S52 when predicting the transfer torque $TQ_{transfer}$ by slip while covert into a torque intervention mode of the steps of S60 and S62 when not predicting the transfer torque $TQ_{transfer}$ by slip. Therefore, the controller may change the other drive shaft input torque $TQ_{input}$-2 transferred to the drive shaft of the rear wheels 1-2 from the torque source 2 20-2 depending on whether predicting the transfer torque $TQ_{transfer}$ by slip of the transmission 40 or not.

Performing the torque prediction mode is implemented as follows.

The step S50 may calculate, by the controller, a first acceleration maintenance control torque $TQ_{feedforward}$-1 transferred to the drive shaft of the rear wheels 1-2. For this, the control may apply the relationship of $TQ_{feedforward}$-1=$TQ_{driver}$−$TQ_{transfer}$. In this regard, the $TQ_{feedforward}$-1 is the first acceleration maintenance control torque, the $TQ_{driver}$ is the drive request torque, $TQ_{transfer}$ is the transmission transfer torque predicted by slip of the transmission 40 at the controller or the transmission controller 50, "=" is a sign of equality meaning that two values are equal, and "−" is a calculation sign calculating a difference between two values. At this case, the prediction of the $TQ_{transfer}$ by slip may be realized in a conventional method of the transmission control field.

Therefore, the $TQ_{feedforward}$-1 may be calculated by the value obtained by subtracting the $TQ_{transfer}$ from the $TQ_{driver}$.

The step S52 may distribute, by the controller, a power to the front wheels and the rear wheels according to the actual shift section entry. For this, the control controls the torque source 1 20-1 so as to transfer the transmission input torque $TQ_{input}$-1 to the drive shaft of the front wheels 1-1 connected with the transmission 40, and controls the torque source 2 20-2 so as to transfer the other drive shaft input torque $TQ_{input}$-2 to the drive shaft of the rear wheels 1-2 not connected with the transmission 40.

Figure 4:
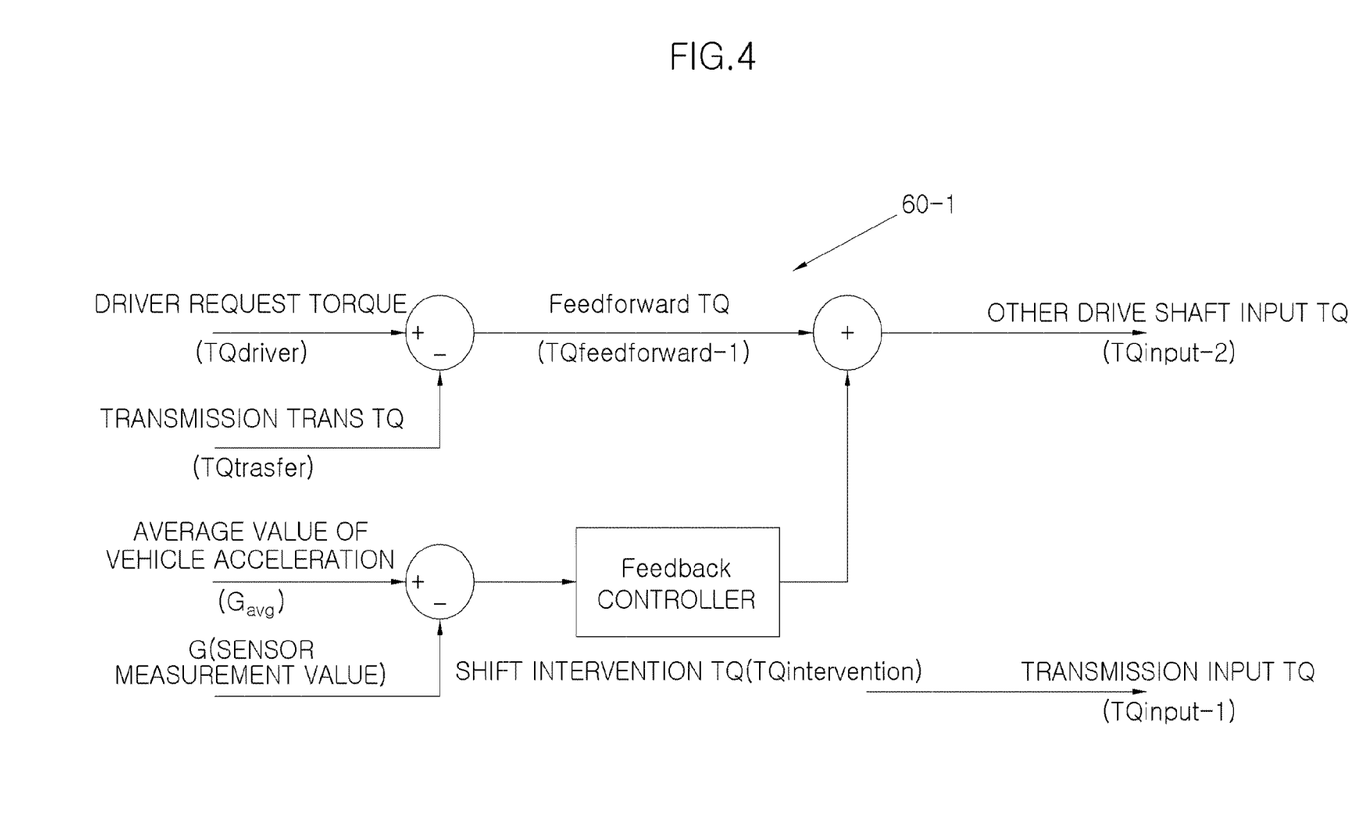
FIG. 4 is an example of a slip feedback controller for generating an acceleration maintenance control torque according to embodiments of the present invention.

Referring to FIG. 4, the torque map controller 60 may be composed of a slip feedback controller 60-1, and the controller may generate the transmission input torque $TQ_{input}$-1 and the other drive shaft input torque $TQ_{input}$-2 in conjunction with the slip feedback controller 60-1.

Concretely, by applying the relationship of $TQ_{input}$-1=$TQ_{intervention}$ to the transmission input torque $TQ_{input}$-1, the controller may calculate monitoring data for the transmission 40 or produce an output for generating the transmission intervention torque $TQ_{intervention}$ provided from the transmission controller 50. By applying the relationship of $TQ_{input}$-2=$TQ_{feedforward}$-1+$G_{avg}$ error compensation value $G_{avg\_compensation}$ to the other drive shaft input torque $TQ_{input}$-2, the controller satisfies the average vehicle acceleration $G_{avg}$ in the actual shift section through the error correction of the average vehicle acceleration and the present vehicle acceleration and then, generates an output for producing the other drive shaft input torque $TQ_{input}$-2.

Performing the torque intervention mode is implemented as follows.

The step S60 may calculate, by the controller, a second acceleration maintenance control torque $TQ_{feedforward}$-2 transferred to the drive shaft of the rear wheels 1-2. For this, the control may apply the relationship of $TQ_{feedforward}$-2=$TQ_{driver}$−$TQ_{intervention}$. In this regard, the $TQ_{feedforward}$-2 is the second acceleration maintenance control torque, the $TQ_{driver}$ is the drive request torque, and $TQ_{intervention}$ is a transmission transfer torque directly calculated by the controller or the transmission controller 50 through a transmission monitoring data or a setting map because of unpredictability by slip of the transmission 40. At this case, the calculation of the $TQ_{intervention}$ may be realized in a conventional method of the transmission control field.

Therefore, the $TQ_{feedforward}$-2 may calculated by subtracting the $TQ_{intervention}$ from the $TQ_{driver}$.

The step S62 may distribute, by the controller, a power to the front wheels and the rear wheels, respectively, according to the actual shift section entry. For this, the control controls the torque source 120-1 so as to transfer the transmission input torque $TQ_{input}$-1 to the drive shaft of the front wheels 1-1 connected with the transmission 40, and controls the torque source 2 20-2 so as to transfer the other drive shaft input torque $TQ_{input}$-2 to the drive shaft of the rear wheels 1-2 not connected with the transmission 40.

Figure 5:
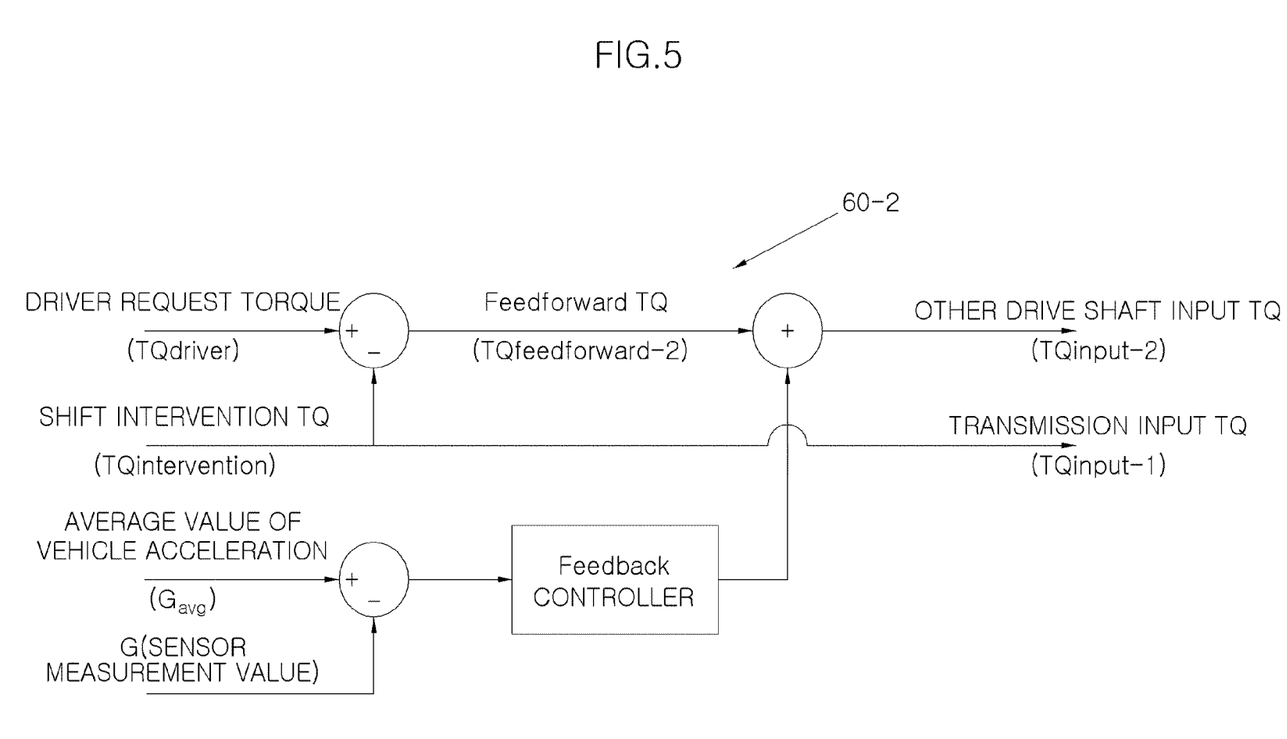
FIG. 5 is an example of a non-slip feedback controller for generating an acceleration maintenance control torque according to embodiments of the present invention.

Referring to FIG. 5, the torque map controller 60 may be composed of a non-slip feedback controller 60-2, and the controller may generate the transmission input torque $TQ_{input}$-1 and the other drive shaft input torque $TQ_{input}$-2 in conjunction with the non-slip feedback controller 60-2.

Concretely, by applying the relationship of $TQ_{input}$-1=$TQ_{intervention}$ to the transmission input torque $TQ_{input}$-1, the controller may calculate monitoring data for the transmission 40 or produce an output for generating the transmission intervention torque $TQ_{intervention}$ provided from the transmission controller 50. By applying the relationship of $TQ_{input}$-2=$TQ_{feedforward}$-2+$G_{avg}$ error compensation value $G_{avg\_compensation}$ to the other drive shaft input torque $TQ_{input}$-2, the controller satisfies the average vehicle acceleration $G_{avg}$ in the actual shift section through the error correction of the average vehicle acceleration and the present vehicle acceleration and then, generates an output for producing the other drive shaft input torque $TQ_{input}$-2.

The step S70 may determine, by the controller, a shift completion in conjunction with the transmission controller 50. The step S70 means that the SP enters into the shift completion section from the actual shift section, thereby stopping the output of the other drive shaft input torque $TQ_{input}$-2.

Figure 6:
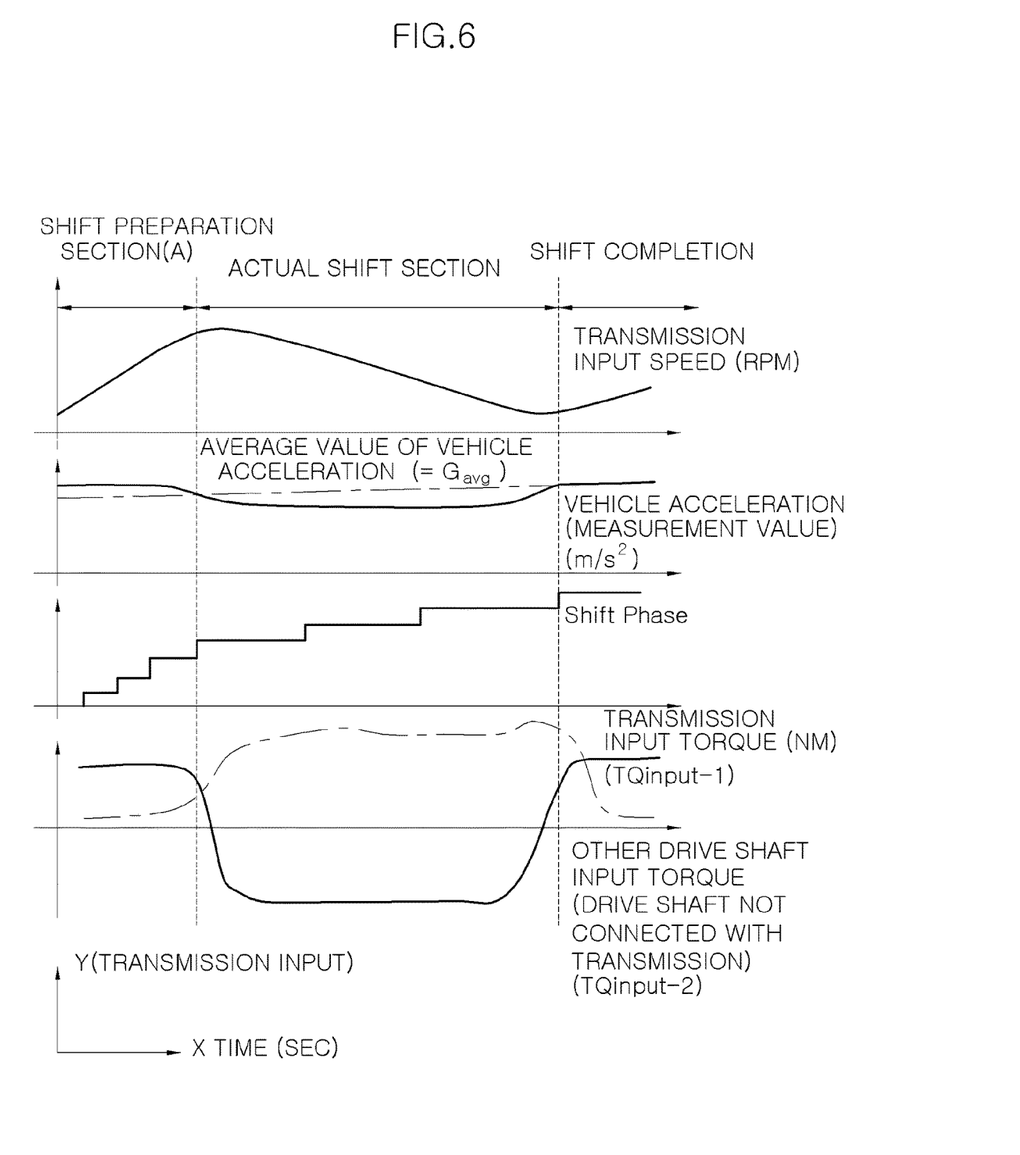
FIG. 6 is an example of a shift process after a 4-wheel drive vehicle according to embodiments of the present invention removes sense of shift difference through the acceleration shift control mod.

Referring to FIG. 6, it is known from the torque line that the other drive shaft input torque $TQ_{input}$-2 and the transmission input torque $TQ_{input}$-1 are compensated each other in the actual shift section. It is known form the acceleration line that the average vehicle acceleration $G_{avg}$ in the actual shift section is maintained to be substantially equal even in the fore-section and post-section of the shift divided into the shift preparation section and the shift completion section. As the result, the acceleration shift control mode may overcome the transfer torque change, which is not overcome in a conventional slip control method, speed control method and time control method, when transferring a torque to the drive wheels in the actual shift section, thereby realizing the shift quality without the sense of shift difference.

As described above, the 4WD vehicle according to an embodiment of the present invention may remove the sense of shift difference through the acceleration shift control mode, and the acceleration shift control mode transfers the independent other drive shaft input torque $TQ_{input}$-2 to the drive shaft not connected to the transmission with respect to the transmission input torque $TQ_{input}$-1 transferred to the drive shaft connected to the transmission, so that the vehicle acceleration in the actual shift section connecting between the fore-section and post-section of the shift of the transmission can be maintained to be equal to the vehicle acceleration of the fore-section and post-section of the shift, thereby overcoming the transfer torque change, which is not overcome in a conventional slip control method, speed control method and time control method, when transferring a torque to the drive wheels in the actual shift section and realizing the shift quality without the sense of shift difference.

The embodiments discussed in the present disclosure are embodiments which may enable a person (hereinafter referred to as 'a skilled person in the relevant technology'), who has a typical knowledge in a technology field that the present invention belongs to, to execute the present invention easily, but the present invention is not limited to the aforesaid embodiments and the attached drawings, and hence this does not result in limiting the scope of right in this invention. Therefore, it will be apparent to a skilled person in the relevant technology that several transposition, transformation, and change is possible within a scope of not deviating from the technological thought in the present invention and it is obvious that a easily changeable part by a skilled person in the relevant technology is included within the scope of right in the present invention as well.

What is claimed is:

1. A method for operating a vehicle, the method comprising:
    driving the vehicle in a present gear stage of a transmission;
    computing an average acceleration of the vehicle while the vehicle is driving in the present gear stage;
    transitioning the transmission from the present gear stage to another gear stage;
    calculating a transfer torque that the transmission is transferring to a front axle of the vehicle during the transitioning of the transmission based on monitoring data of the transmission; and
    generating an acceleration maintenance control torque for compensating a transfer torque drop due to at least one slip during transition of the transmission using a motor connected to a rear axle of the vehicle such that the vehicle maintains the average acceleration before and after the transition of the transmission.

2. The method according to claim 1, wherein the average acceleration is computed using a G sensor of the vehicle.

3. A 4-wheel drive vehicle, comprising:
    a front axle;
    a rear axle;
    an engine connected to the front axle for supplying engine power to the front axle;
    a motor connected to the rear axle for supplying motor power to the rear axle;
    a transmission interconnecting the engine to the front axle for transferring the engine power to the front axle; and
    at least one controller configured to control operation of the transmission and the motor,
    wherein the at least one controller is configured to:
        compute an average acceleration of the vehicle when the vehicle is driving in a present gear stage of the transmission;
        cause the transmission to transition from the present gear stage to another gear stage;
        calculate a transfer torque that the transmission is transferring to the front axle of the vehicle during transition of the transmission based on monitoring data of the transmission; and
        cause the motor to generate an acceleration maintenance control torque for compensating a transfer torque drop due to at least one slip during transition of the transmission such that the vehicle maintains the average acceleration before and after the transition of the transmission.

4. The 4-wheel drive vehicle of claim 3, further comprising a feedback controller configured to calculate the acceleration maintenance control torque.

* * * * *